United States Patent [19]

Yamada et al.

[11] Patent Number: 4,468,692

[45] Date of Patent: Aug. 28, 1984

[54] METHOD FOR VARYING COLORS OF A PICTURE IMAGE, DISPLAYED IN A COLOR DISPLAY, FOR REPRODUCING A COLOR PRINTED MATTER

[75] Inventors: Mitsuhiko Yamada, Kyoto; Tukasa Nishida, Osaka; Toshifumi Inoue, Kyoto, all of Japan

[73] Assignee: Dainippon Screen Seizo Kabushiki Kaisha, Kyoto, Japan

[21] Appl. No.: 412,725

[22] Filed: Aug. 30, 1982

[30] Foreign Application Priority Data

Sep. 16, 1981 [JP] Japan .............................. 56-144792

[51] Int. Cl.³ .......................... G03F 3/10; G03F 3/08
[52] U.S. Cl. ........................................ 358/76; 358/80
[58] Field of Search .................................. 358/76, 80

[56] References Cited
U.S. PATENT DOCUMENTS 4,335,398  4/1980  Yamada ................................. 358/80
4,393,398  7/1983  Horiguchi et al. ................... 358/76

Primary Examiner—John C. Martin
Assistant Examiner—E. A. McDowell
Attorney, Agent, or Firm—Lilling & Greenspan

[57] ABSTRACT

A method for varying colors of a picture image, displayed in a color display, for reproducing a color printed matter, in which density signals of cyan, magenta, yellow and black, picked up from an original picture are fed to a color display to display a color picture image corresponding to the color printed matter to be obtained is disclosed. Color ink signals of cyan, magenta and yellow for recording a color printed matter are converted into color separation density signals of red, green and blue by using the first table memories, and then the converted color separation density signals are added one by one. Then, correction values for printing the color inks one above another, read out of the second table memories depending on the color ink signals, are added to the added color separation density signals. A correction value for printing the black ink upon the other color inks, read out of the third table memory depending on the black and the color ink signals, may be added to thus the obtained signal.

3 Claims, 5 Drawing Figures

METHOD FOR VARYING COLORS OF A PICTURE IMAGE, DISPLAYED IN A COLOR DISPLAY, FOR REPRODUCING A COLOR PRINTED MATTER

BACKGROUND OF THE INVENTION

The present invention relates to a method for varying colors of a picture image, displayed in a color display such as an electronic color proof means in which a picture image having the similar colors to those of a printed matter finished is displayed in a color cathod ray tube (CRT) before printing in order to check or anticipate color separation conditions when color separation plates are produced, a color separation condition setup monitor for a color scanner, a color correction monitor for a color layout scanner, or the like, in a digital manner.

In general, in a multicolor printing three color inks of subtractive primary colors such as cyan, magenta and yellow and a black color ink for supplementing mainly a dark tone are used, and such inks are printed at the desired ratio, thereby obtaining a variety of colors. Therefore, the reproduced color tone of the printed matter finished almost depends on the color separation plates which directly influence the amounts of the inks.

In a conventional color proofing of a multicolor printed matter, printing plates are made from color separation plates or films, and then a proof is printed by the printing plates by using the inks. Then, the obtained proof is checked. When it is judged that the obtained proof is improper or it is empirically judged from the states of an original color picture and the color separation plates that it is necessary to correct the proof, the color separation plates are manually and directly retouched or are re-produced under other corrected color tone and color separation conditions. Then, by using the retouched or the re-produced color separation plates a fresh proof is obtained and checked again, in the manner of trial and error.

Accordingly, in this method, every time, the color separation plates are corrected or re-produced, and then printing plates for proofing are prepared depending on the necessary colors. Then the proof is obtained by using a proof press or a printing press. Therefore, this method involves a lot of time and trouble and much cost.

In order to remove such defects, the electronic color proof means has been realized. In this case, the color separation plates are recorded by recording video signals obtained by photographing consecutively the color separation plates by using a TV camera, and then the video signals for the color separation plates are periodically reproduced in the same time into the color separation plates while the colors of the printed matter to be reproduced are calculated in an electronic circuit and the calculated results are displayed in a color cathod ray tube, hereinafter referred to as a color CRT.

Further, a method in which a plurality of color separation plates are synchronously scanned by a flying spot tube and are displayed as color images without recording, has been developed. In this case, the color CRT is actuated by additive primary color signals R, G and B of red, green and blue, and hence subtractive primary color signals C, M, Y and K of cyan, magenta, yellow and black, which are output from the electronic circuit of the electronic color proof means, must be converted into the additive primary color signals R, G and B.

One such a signal conversion means has been known, as disclosed in Japanese Patent Publication No. 51-4777, wherein in order to correct the additivity law failure which is arisen at a position where a plurality of color inks are printed one above the other, the so-called Neugebauer's equation is utilized. Another signal conversion method has been proposed, as disclosed in Japanese Patent Publications Nos. 54-38921 and 54-38922. In this case, while the under color removal is jointly used in order to prevent the gradation from being gone or compressed from the intermediate portion to the shadow portion, the subtractive color signals C, M, Y and K are converted into the additive color signals R, G and B.

Another signal conversion method has been also developed, as disclosed in Japanese Patent Publication No. 56-26015 (Japanese Patent Application No. 51-123795). In this case, such a signal conversion is carried out in an analog circuit, supplementing a calculation for correcting the additivity law failure in consideration of the unnecessary absorbing component of the ink, that is, the so-called "impurity of ink". However, these conventional methods described above are performed in the analog manner.

Recently, with the advance of the digitalization of the electric circuits, the electronic color proof means of such signal conversion means for the above purposes have been digitalized. However, in fact, this digitalization is carried out by simply converting the analog circuits into the digital circuits. Hence, when such a signal conversion is performed in a digital circuit which is composed of a multiplier, or the like. Therefore, the processing of the signal conversion requires a lot of time. Accordingly, when the high speed processing is necessary for this signal conversion, many inconveniences arise.

Furthermore, in the conventional electronic color proof means, when the colors of the printed matter reproduced are displayed, the problem of the additivity law failure occurs.

The additivity law failure is caused at the position where a plurality of color inks are printed one above another, and its strength varies complicatedly depending on the amounts of the inks, the printing order, and so forth.

There is still another problem, that is, as shown in FIG. 1, the densities of red, green and blue components of the ink do not vary linearly with respect to the half-tone dot area rates.

SUMMARY OF THE INVENTION

It is an object of the present invention to provide a method for varying colors of a picture image, displayed in a color display, for reproducing a color printed matter, free from the aforementioned defects, which is simple and is capable of performing a quick, exact and reliable operation.

According to the present invention there is provided a method for varying colors of a picture image, displayed in a color display, for reproducing a color printed matter, wherein density signals of cyan, magenta, yellow and black, picked up from an original picture, are fed to a color display to display a color picture image corresponding to the color printed matter to be obtained, the improvement which comprises the steps of (a) converting color ink signals of cyan, magenta and yellow for recording a color printed matter into color separation density signals of red, green and blue by using the first table memories, (b) adding the converted color separation density signals one by one, and (c) adding correction values for printing the color inks one above another, which are read out of the second table memories depending on the color ink signals of the color inks to be printed one above another, to said added color separation density signals to obtain a corrected color component density signal.

BRIEF DESCRIPTION OF THE DRAWINGS

In order that the present invention may be better understood, a preferred embodiment thereof will be described with reference to the accompanying drawings, in which.

DESCRIPTION OF THE PREFERRED EMBODIMENT

Figure 1:
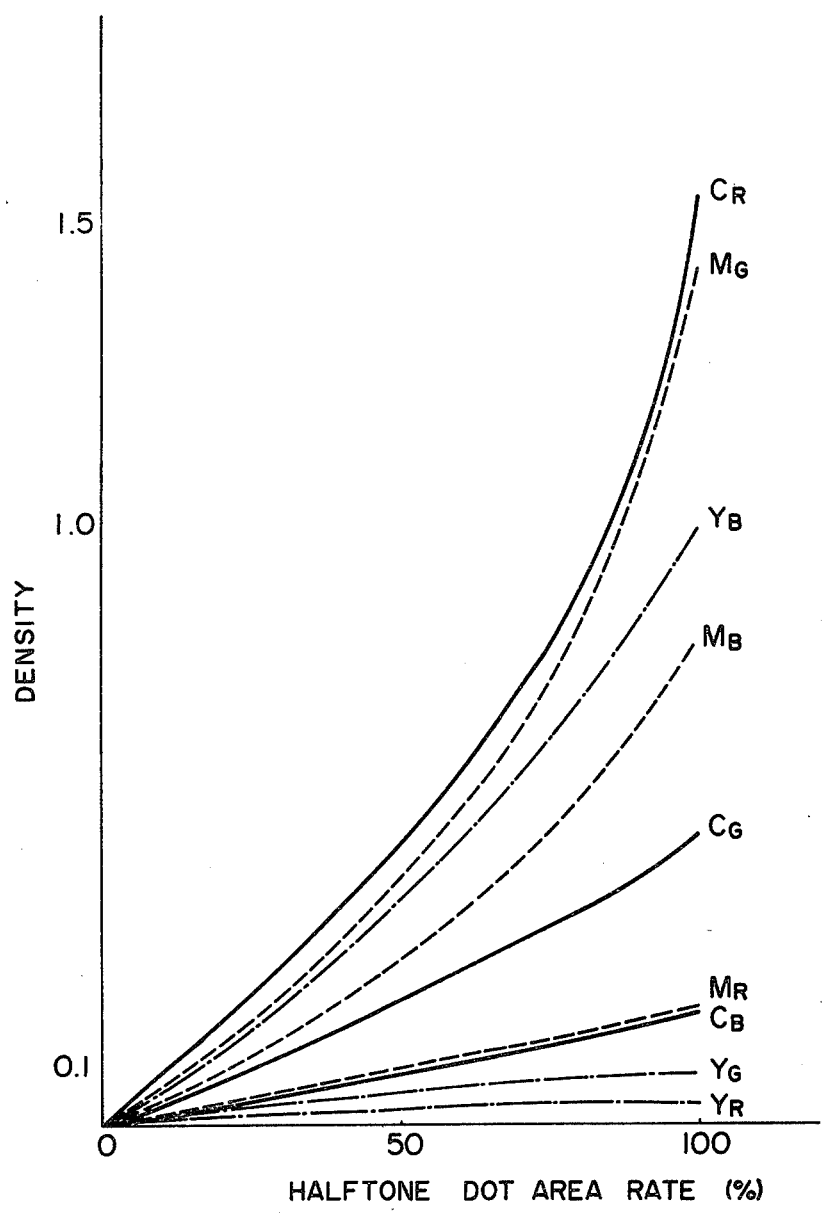
FIG. 1 is a graph showing color separation densities of primary color inks with reference to halftone dot area rates.
Figure 2:
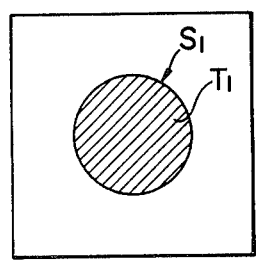
FIGS. 2 and 3 show halftone dots recorded on transparent sheets, for the explanation of a principle of a method according to the present invention.

Referring to the drawings there is shown in FIG. 2 a halftone dot having a transmittance $T_1$ and an area $S_1$, which is recorded on a transparent sheet having a transmittance of one and a unit area of one. A density $D_1$ is expressed in the following formula.

$$D_1 = -\log_{10}[(1-S_1) + S_1 T_1] \quad \text{(I)}$$

Figure 3:
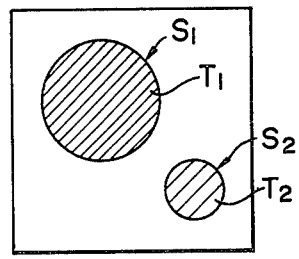

Further, one more halftone dot having a transmittance $T_2$ and an area $S_2$ is recorded on the transparent sheet of FIG. 2, as shown in FIG. 3. In this case, the density $D_{12}$ is obtained as follows.

$$D_{12} = -\log_{10}[(1-S_1)(1-S_2) + S_1(1-S_2)T_1 + S_2(1-S_1)T_2 + S_1 S_2 T_{12}] \quad \text{(II)}$$

In this formula, $T_{12}$ means a transmittance of an overlapped part of $S_1$ and $S_2$.

Meanwhile, the simple sum $D_1 + D_2$ of the two densities $D_1$ and $D_2$ are obtained in the following formula, while $S_1$ and $S_2$ are independently measured.

$$D_1 + D_2 = -\log_{10}[(1-S_1) + S_1 T_1] - \log_{10}[(1-S_2) + S_2 T_2] \quad \text{(III)}$$
$$= -\log_{10}[(1-S_1)(1-S_2) + S_1(1-S_2)T_1 + S_2(1-S_1)T_2 + S_1 S_2 T_1 T_2]$$

If $T_{12}$ of the formula (II) and $T_1$ and $T_2$ of the formula (III) satisfy a formula $T_{12} = T_1 T_2$, the simple addition holds good when a plurality of color inks are printed one above another.

However, when the formula $T_{12} = T_1 T_2$ does not hold good owing to the additivity law failure and so forth, this formula is necessarily rewritten as $T_{12} = T_1 T_2 + \Delta_{12}$.

In the same manner as above, if the additivity law holds good, the density $D_{YMCK}$ is obtained according to the Neugebauer's equation, when the color inks C, M, Y and K are printed one above another, in the following formula, wherein y, m, c and k mean halftone dot area rates of the color inks Y, M, C and K, wherein $R_y$, $R_m$, $R_c$ and $R_k$ means reflectances of one-color printing parts, wherein $R_{ym}$, $R_{mc}$, $R_{ck}$ and $R_{ky}$ mean reflectances of two-color printing parts, wherein $R_{ymc}$, $R_{mck}$, $R_{cky}$ and $R_{kym}$ mean three-color printing parts, and wherein $R_{ymck}$ means a four-color printing part.

$$D_{YMCK} = -\log[(1-y)(1-m)(1-c)(1-k) + \quad \text{(IV)}$$
$$y(1-m)(1-c)(1-k)R_y + m(1-y)(1-c)(1-k)R_m +$$
$$c(1-y)(1-m)(1-k)R_c + k(1-y)(1-m)(1-c)R_k +$$
$$ym(1-c)(1-k)R_{ym} + mc(1-y)(1-k)R_{mc} +$$
$$ck(1-y)(1-m)R_{ck} + ky(1-m)(1-c)R_{ky} +$$
$$ymc(1-k)R_{ymc} + mck(1-y)R_{mck} + cky(1-m)R_{cky} +$$
$$kym(1-c)R_{kym} + ymck \cdot R_{ymck}]$$

However, in fact, the additivity law does not hold good in an actual printed matter, and thus the following replacements are necessary, in the same manner as described above.

$$R_{ym} = R_y R_m + \Delta_{ym}$$
$$R_{ky} = R_k R_y + \Delta_{ky}$$
$$R_{ymc} = R_y R_m R_c + \Delta_{ymc}$$
$$R_{kym} = R_k R_y R_m + \Delta_{kym}$$
$$R_{ymck} = R_y R_m R_c R_k + \Delta_{ymck}$$

Hence, the formula (IV) is rewritten as follows.

$$D_{YMCK} = -\log[(1-y)(1-m)(1-c)(1-k) + \quad \text{(IV')}$$
$$y(1-m)(1-c)(1-k)R_y + m(1-y)(1-c)(1-k)R_m +$$
$$c(1-y)(1-m)(1-k)R_c + k(1-y)(1-m)(1-c)R_k +$$
$$ym(1-c)(1-k)(R_y R_m + \Delta_{ym}) + mc(1-y)(1-k)(R_m R_c +$$
$$\Delta_{mc}) + ck(1-y)(1-m)(R_c R_k + \Delta_{ck}) +$$
$$ky(1-m)(1-c)(R_k R_y + \Delta_{ky}) + ymc(1-k)(R_y R_m R_c +$$
$$\Delta_{ymc}) + mck(1-y)(R_m R_c R_k + \Delta_{mck}) + cky(1-m)(R_c R_k R_y +$$
$$\Delta_{cky}) + kym(1-c)(R_k R_y R_m + \Delta_{kym}) +$$
$$ymck(R_y R_m R_c R_k + \Delta_{ymck})]$$
$$= D_Y + D_M D_C D_K - \log[ym(1-c)(1-k)\Delta_{ym} +$$
$$mc(1-y)(1-k)\Delta_{mc} + ck(1-y)(1-m)\Delta_{ck} +$$
$$ky(1-m)(1-c)\Delta_{ky} + ymc(1-k)\Delta_{ymc} + mck(1-y)\Delta_{mck} +$$
$$cky(1-m)\Delta_{cky} + kym(1-c)\Delta_{kym} + ymck\Delta_{ymck}]$$

The Neugebauer's equation not always holds good exactly due to the dispersion of the light in the paper, and so forth. However, with reference to the color difference the Neugebauer's equation can be utilized in practice, and therefore it is significant to correct the additivity law failure by using the formula (IV').

However, when the formula (IV') is realized in a digital manner by using table memories, a four-dimensional multiplication is required, and thus large table memories are necessary. For example, when the gradation of each color is divided into 16 steps, i.e. 16 address points of the table memory, 9 table memories having 64 kilobytes are required. That is, the capacity of the table memories will become enormous, and a complicated and large-scaled apparatus for carrying out this method is required.

According to the present invention, the correction for the additivity law failure of the multicolor printing by using the color inks Y, M and C, and so forth, are performed, and then the correction for printing the black ink is carried out, thereby converting the color ink signals Y, M, C and K into the color signals R, G and B faithfully and quickly by using a simple circuit and small table memories. When the three color inks Y, M and C are printed one above another, the density $D_{YMC}$ is obtained as follows.

$$D_{YMC} = -\log[(1-y)(1-m)(1-c) + y(1-m)(1-c)R_y +$$
$$m(1-y)(1-c)R_m + c(1-y)(1-m)R_c + ym(1-c)R_{ym} +$$
$$mc(1-y)R_{mc} + cy(1-m)R_{cy} + ymc \cdot R_{ymc}] \quad (V)$$
$$= -\log[(1-y)(1-m)(1-c) + y(1-m)(1-c)R_y +$$
$$m(1-y)(1-c)R_m + c(1-c)(1-m)R_c +$$
$$ym(1-c)R_yR_m + mc(1-y)R_mR_c + cy(1-m)R_cR_y + ymc \cdot$$
$$R_yR_mR_c + ym(1-c)\Delta_{ym} + mc(1-y)\Delta_{mc} +$$
$$cy(1-m)\Delta_{cy} + ymc \cdot \Delta_{ymc}]$$
$$= D_Y + D_M + D_C - \log[ym(1-c)\Delta_{ym} + mc(1-y)\Delta_{mc} +$$
$$cy(1-m)\Delta_{cy} + ymc \cdot \Delta_{ymc}]$$

Then, the correction for printing the black ink above the other color inks is performed, thereby converting the color ink signals Y, M, C and K into the color signals R, G and B for reproducing a picture image on the display.

Figure 4:
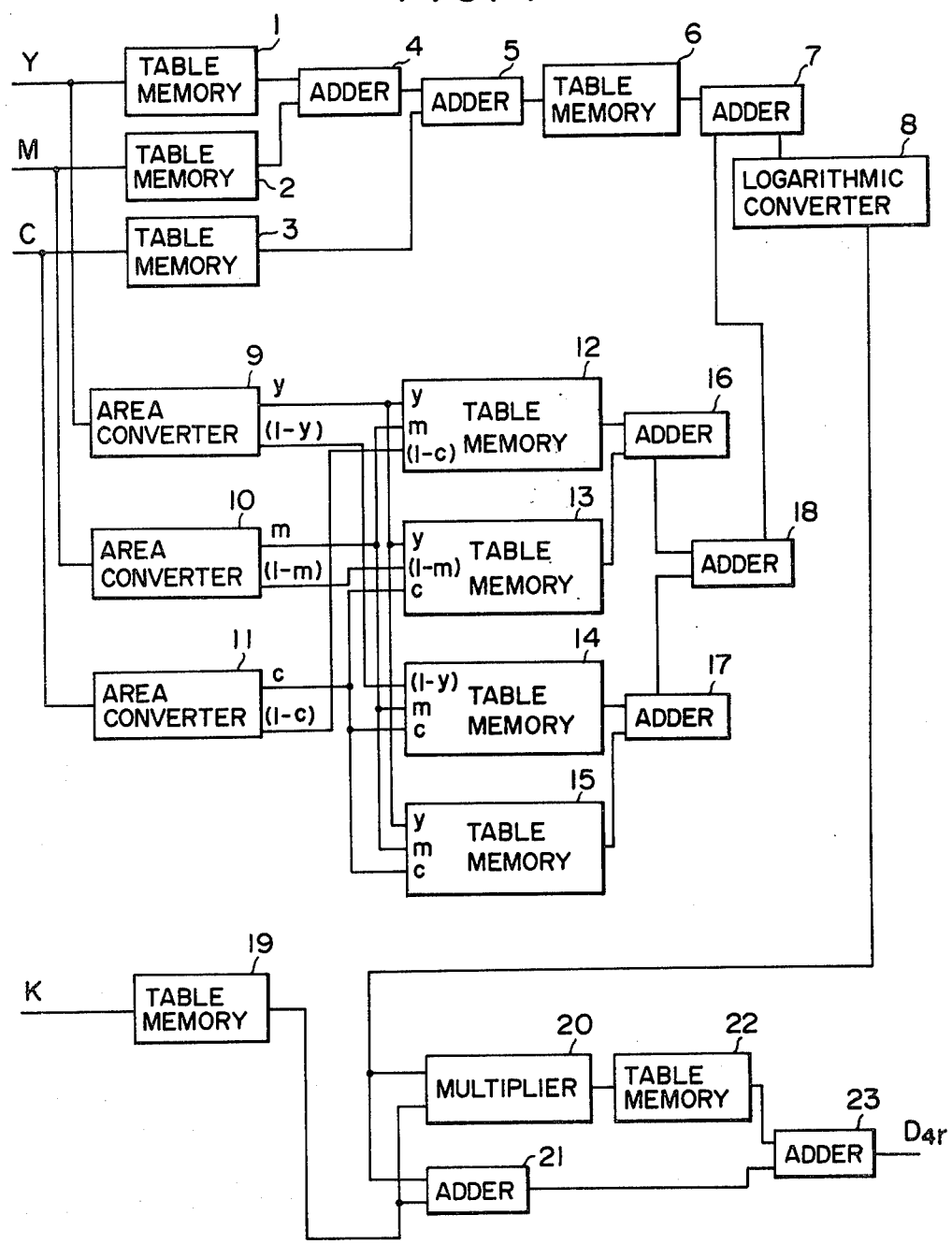
FIG. 4 shows one embodiment of a circuit which carries out a method according to the present invention.

In FIG. 4 there is shown one embodiment of a circuit for carrying out a method according to the present invention. In order to simplify the explanation, the circuit for converting from the color ink signals Y, M, C and K into the color signal R is shown, but in fact the other circuits for obtaining the other color signals G and B in the same manner as above are provided in parallel.

The digital color ink signals Y, M and C corresponding to the halftone dot area rates are fed to table memories 1, 2 and 3, respectivily, and are converted therein into color separation density signals $D_{yr}$, $D_{mr}$ and $D_{cr}$. Then the color separation density signals $D_{yr}$ and $D_{mr}$ are added in an adder 4, and then the added signal output from the adder 4 and the color separation density signal $D_{cr}$ are added in an adder 5. The added signal $D_{yr}+D_{mr}+D_{cr}$ is sent to a table memory 6 and is converted therein into a reflectance.

On the other hand, the digital color ink signals Y, M and C are fed to area converters 9, 10 and 11 and are so converted therein that the halftone dot area rate 0-100% may correspond to the area 0-1, and thereby the area converters 9, 10 and 11 output signals y, m and c which correspond to color ink areas per a unit area, while $0 < y, m, c \leq 1$, and signals $(1-y)$, $(1-m)$ and $(1-c)$, respectively. Combinations of these signals y, $(1-y)$, m, $(1-m)$, c and $(1-c)$ are sent to table memories 12, 13, 14 and 15.

Figure 5:
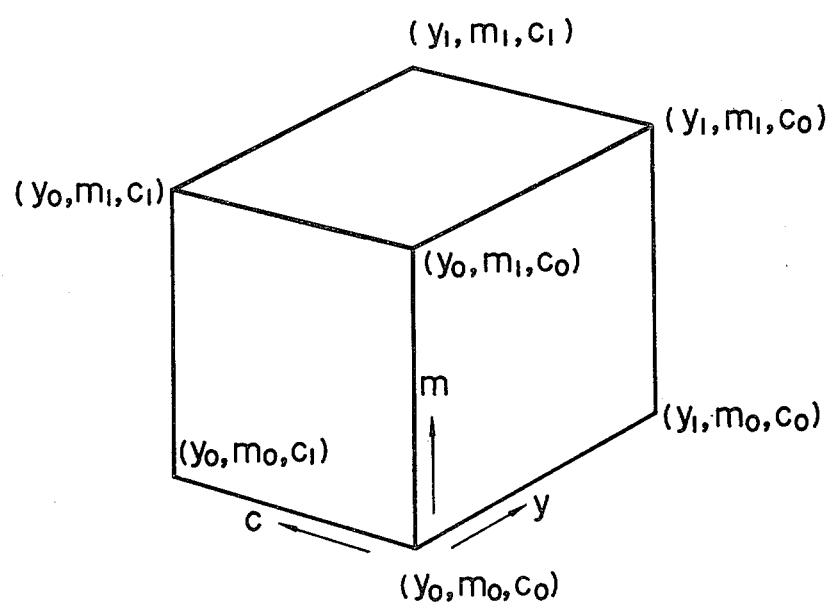
FIG. 5 shows one embodiment of a table memory shown in FIG. 4.

In these table memories 12, 13, 14 and 15, each having a construction, as shown in FIG. 5, the values $ym(1-c)\Delta_{ym}$, $mc(1-y)\Delta_{mc}$, $cy(1-m)\Delta_{cy}$ and $ymc \cdot \Delta_{ymc}$ of the formula (V), which are calculated in advance, are stored, respectively. The values $\Delta_{ym}$, $\Delta_{mc}$, $\Delta_{cy}$ and $\Delta_{ymc}$ are correction values, for example, $\Delta_{ym}$ is the correction value corresponding to the difference between the sum of the actual density values which are obtained by measuring independently the magenta and the yellow inks printed with the predetermined halftone dot area rate, and the actual density value of the printed inks one above another of the same. These values can be obtained in advance.

When the two colors of the color inks Y, M and C are printed one upon another, only one of the table memories 12, 13 and 14 outputs the correction value, but when the three colors of the color inks Y, M and C are printed one upon another, all the table memories output the correction values. Hence, the correction value stored in the table memory 15 is smaller than that of the other table memories 12, 13 and 14.

The values $ym(1-c)\Delta_{ym}$, $mc(1-y)\Delta_{mc}$, $cy(1-m)\Delta_{cy}$, and $ymc \cdot \Delta_{ymc}$ corresponding to the reflectances, output from the table memories 12, 13, 14 and 15, are added altogether by adders 16, 17 and 18. Thus the added value is sent to an adder 7 and is added to the output of the table memory 6, corresponding to the reflectance of the added value $D_{yr}+D_{mr}+D_{cr}$, therein. Then, the output signal of the adder 7 is sent to a logarithmic converter 8 and is converted therein logarithmically, and thereby the logarithmic converter 8 outputs a corrected red (R) color component density signal $D_{3r}$ for the color inks of Y, M and C printed one upon another.

Meanwhile, the black color ink signal K corresponding to a halftone dot area rate is sent to a table memory 19 and is converted therein into a black color component density signal $D_{kr}$. This density signal $D_{kr}$ is sent to a multiplier 20 and an adder 21. The corrected red color component density signal $D_{3r}$ is sent to the multiplier 20 and the adder 21 in which the corrected red color component density signal $D_{3r}$ is added to the black color component density signal $D_{kr}$.

In the multiplier 20, the corrected red color component density signal $D_{3r}$ and the black color component density signal $D_{kr}$ are multiplied to each other, thereby outputting a value $D_{3r}D_{kr}$. This is sent to a correction table memory 22 as an address signal, and thereby the table memory 22 outputs a correction value corresponding to $$-\frac{D_{3r}D_{kr}}{k},$$

to an adder 23. This value k is a fixed number determined depending on the pitch of halftone dots and the quality of paper of the printed matter, and so forth, and possesses a value of a range of 2.0–3.0 for a usual printed matter. In this embodiment, for example, k is determined to 2.0.

The correction value output from the table memory 22 is added in the adder 23 to the added value $D_{3r}+D_{kr}$ which is sent from the adder 21, and thereby, when one color ink is printed or the color inks are printed one upon another, the adder 23 outputs a color separation density signal $D_{4r}$ for red color, while the additivity law failure is corrected.

In this embodiment, the data for converting the digital color ink signals corresponding to the halftone dot area rates into the color separation density signals are obtained by measuring the actual color patches printed by the inks of Y, M, C and K colors, and are stored in the table memories 1, 2, 3 and 19, in advance.

The correction values for printing the color inks one upon another are obtained according to the formula (V) and are stored in the table memories 12, 13, 14 and 15, in advance. The correction value for printing the black color ink on the other color ink or inks is obtained according to $$-\frac{D_{3r}D_{kr}}{k}$$

wherein k equals 2.0, and the obtained correction value is stored in the correction table memory 22, in advance.

Then, the value actually measured of each color patch which is separately prepared by two-color, three-color or four-color printing is compared with the corresponding value stored in the table memory 12, 13, 14 or 15, consecutively, thereby preparing the data to be stored in the table memories 12, 13, 14 and 15.

Consequently, the data to be stored in the table memories are so prepared that the reproduction picture reproduced by the color signals R, G and B which are obtained by converting the color separation density signals $D_{4b}$, $D_{4g}$ and $D_{4r}$ obtained according to the circuit of FIG. 4, antilogarithmically, may be the same as the printed matter of the original picture.

According to the present invention, instead of the above described method on the basis of the Neugebauer's equation, the following formula for correcting the additivity law failure is used, wherein $D_1$, $D_2$, ..., $D_n$ mean color component densities, and k means a fixed number, as described above.

$$D = k\left[1 - \left(1 - \frac{D_1}{k}\right)\left(1 - \frac{D_2}{k}\right)\ldots\left(1 - \frac{D_n}{k}\right)\right]$$

Now, if red color component densities of the color inks of Y, M and C are $D_{yr}$, $D_{mr}$ and $D_{cr}$, respectively when the color inks of Y, M and C are printed one upon another, the red color separation density signal $D_{IIIr}$ is obtained as follows.

$$D_{IIIr} = k\left[1 - \left(1 - \frac{D_{yr}}{k}\right)\left(1 - \frac{D_{mr}}{k}\right)\left(1 - \frac{D_{cr}}{k}\right)\right]$$

$$= D_{yr} + D_{mr} + D_{cr} -$$

-continued $$\left(\frac{D_{yr}D_{mr}}{k} + \frac{D_{mr}D_{cr}}{k} + \frac{D_{cr}D_{yr}}{k} + \frac{D_{yr}D_{mr}D_{cr}}{k^2}\right)$$

Although the correction values stored in the table memories 12, 13, 14 and 15 of the embodiment shown in FIG. 4 correspond to the reflectances, however, in this embodiment, the correction values correspond to density values. Therefore, the area converters 9, 10 and 11, the table memory 6 and the logarithmic converter 8 can be omitted, and the detailed construction may be somewhat changed. However, the essential or basic construction is the same as that of FIG. 4. In this embodiment, first the correction for the three color inks of Y, M and C printed one upon another is carried out, and then the correction for the black color ink printed on the other color ink or inks is performed, in the same manner as the embodiment of FIG. 4.

Although the present invention has been described in some detail by way of illustration and example for purposes of clarity of understanding, it will, of course, be understood that various changes and modifications may be made in the form, details, and arrangements of the parts without departing from the scope of the present invention.

What is claimed is:

1. A method for varying colors of a picture image, displayed in a color display, for reproducing a color printed matter, wherein density signals of cyan, magenta, yellow and black, picked up from an original picture, are fed to a color display to display a color picture image corresponding to the color printed matter to be obtained, the improvement which comprises the steps of:
   (a) converting color ink signals of cyan, magenta and yellow for recording a color printed matter into color separation density signals of red, green and blue by using first table memories;
   (b) adding the converted color separation density signals one by one; and
   (c) adding correction values for printing the color inks one above another, which are read out of second table memories depending on the color ink signals of the color inks to be printed one above another, to said added color separation density signals to obtain a corrected color component density signal.

2. A method as defined in claim 1, further comprising adding a correction value for printing the black ink and the color inks one above another, which is read out of a third table memory depending on a black ink signal and the color ink signals of the black and the color inks to be printed one above another, to the corrected color component density signal to obtain a corrected density signal.

3. A method as defined in claim 2, further comprising adding the black ink signal to the corrected density signal.

* * * * *